(12) United States Patent
Seland et al.

(10) Patent No.: US 6,752,519 B2
(45) Date of Patent: Jun. 22, 2004

(54) LIGHTING DEVICE FOR INSTALLATION IN PLANE SURFACE

(75) Inventors: Henrik Seland, Oslo (NO); Eldar Hagen, Oslo (NO)

(73) Assignee: Advanced Light AS, Oslo (NO)

(*) Notice: Subject to any disclaimer, the term of this patent is extended or adjusted under 35 U.S.C. 154(b) by 12 days.

(21) Appl. No.: 10/176,502

(22) Filed: Jun. 21, 2002

(65) Prior Publication Data

US 2003/0235051 A1 Dec. 25, 2003

(51) Int. Cl.[7] ................................................ F21V 5/02
(52) U.S. Cl. ...................... 362/339; 362/364; 362/308; 362/153.1; 362/244
(58) Field of Search ................................ 362/364, 339, 362/308, 309, 147, 244, 457, 153.1, 153, 293, 267

(56) References Cited

U.S. PATENT DOCUMENTS

| | | | |
|---|---|---|---|
| 3,999,054 A | | 12/1976 | Dorman |
| 4,860,182 A | * | 8/1989 | Vadseth ...................... 362/364 |
| 5,335,151 A | * | 8/1994 | Dahlberg .................. 362/153.1 |
| 5,676,448 A | * | 10/1997 | Urbaing .................... 362/153.1 |
| 5,727,873 A | * | 3/1998 | Tyson .......................... 362/294 |
| 6,033,083 A | * | 3/2000 | Reinert, Sr. .............. 362/153.1 |

FOREIGN PATENT DOCUMENTS

| | | |
|---|---|---|
| CA | 1 200 537 | 4/1985 |
| WO | WO 88/00156 | 7/1987 |
| WO | WO 91/14620 | 10/1991 |
| WO | WO 97/44611 | 5/1997 |

\* cited by examiner

Primary Examiner—Alan Cariaso
Assistant Examiner—Ali Alavi
(74) Attorney, Agent, or Firm—Sierra Patent Group, Ltd.

(57) ABSTRACT

A lighting device for installation in a substantially plane surface, comprising at least one lamp device that emits light essentially in a light direction which forms an angle with an exit face of a light refracting means in the lamp device. The lamp device comprises a light source that emits light towards an incident face of the light refracting means, where the light refracting means has a longitudinal direction coincident with the light direction, and where the exit face is approximately parallel to the substantially plane surface. The exit face is set a slight angle of inclination relative to the substantially plane surface, the angle and the angle of inclination in combination causing light from the light source to be brought to an emergent angle above the face that satisfies pre-set requirements for light intensity close to the surface.

A prism is also described wherein at least the edge formed between the exit face of the prism and a side face which forms an acute angle with the exit face is rounded.

58 Claims, 1 Drawing Sheet

LIGHTING DEVICE FOR INSTALLATION IN PLANE SURFACE

PRIOR APPLICATIONS

This application claims priority to Norway application number; 1999 6408 filed on Dec. 22, 1999, Norway application number 2000 3554 filed Jul. 10, 2000 and International Application number PCT/NO00/00437 filed on Dec. 20, 2000.

BACKGROUND

The invention relates to a lighting device for installation in a substantially planar surface.

Lighting devices of the aforementioned type are particularly useful in airports, and especially for use as marking of the correct path for incoming aircraft or aircraft taxiing on the runway, or to make centre lines or limits visible to the pilots.

A number of lighting devices for installation in a plane surface, and in particular for use in airports, are previously known. A device of the type mentioned above is taught in U.S. Pat. No. 4,860,182. This device comprises a prism holder for installation in a plane, preferably horizontal surface, and in particular in a runway. The prism holder has two orifices in its upper surface. A light refracting means in the form of a prism grating is arranged in each orifice. Each prism grating consists of parallel glass discs having a common longitudinal direction and of uniform thickness that are bonded adhesively to one another. The prism gratings preferably consist of borosilicate glass, and a metal foil may be placed between each disc. Each prism grating is secured in place in the prism holder by means of an adhesive.

Positioned in the lower part of the prism holder are two angle-set light sources, each having a reflector arranged to emit light in rays that are essentially parallel in a principal direction. Each light source and reflector is inclined in such a manner that the principal direction of the light source is parallel to the common longitudinal direction of the parallel discs in the associated prism grating. The inclination, expressed as the angle that the principal direction of the light sources forms with the exit face, is said to be 45°.

The end of the prism grating that faces the corresponding light source forms an incident face that is essentially at right angles to the principal direction of the light sources. The incident face may be plane, convex or concave. In the first-mentioned case, the parallel light beams from a light source fall essentially perpendicular to the plane incident face or plane of incidence. The prism grating also has a plane exit face, which is parallel to the surface in which the device is to be located. The light in the prism grating strikes the plane of reflection at an angle that is not a right angle. Therefore, the light will be refracted so that it is transmitted at an angle of reflection determined by the refractive properties of the prism grating and the aforementioned angle of 45°.

When installed and used in a runway, the prism holder is inserted into a recess in the runway, with a resilient layer between the bottom of the recess and the prism holder. The top face of the prism holder has projections on either side of each of the prism grating orifices. The height of the projections corresponds to the thickness of the resilient layer. If a sufficiently large force is exerted on the top face of the prism holder, for example, by an aircraft passing with one wheel directly on the prism holder, the layer will yield elastically so that the prism holder temporarily moves slightly downwards in the recess.

A first disadvantage of this known device is that the projections in use form irregularities or bumps for passing aircraft and other vehicles. In particular, the projections are an obstacle for snow clearing in the winter season. Moreover, a sand-blast effect could easily be produced by jet engines blowing sand and gravel from the ground towards the prisms. The projections around the prisms ensure that sand and gravel remain near the prism and swirl around in the vicinity thereof for varying periods of time. In the course of this time, the sand makes dents and scratches in the prism surface. This effect will be particularly noticeable when the prism is at an angle relative to the ground. Moreover, dirt and snow or slush will accumulate around the prism when the ground is cleared or swept. The brushes of sweeping equipment themselves will strike against the prism and might damage it. Therefore, after a certain period of use, there will be a great reduction in the light intensity. The requirements set by the International Civil Aviation Organization (ICAO) relate to new lighting equipment and there are no requirements as regards the properties of the lighting equipment after a period of use. For this reason, there is a great deal of equipment that when new will satisfy the ICAO's requirements, but which deteriorates rapidly.

A second disadvantage of the known device consists of the weaknesses associated with the elastic flexibility of the prism holder in the vertical direction. This flexibility causes operational problems over time, due in part to the fact that the properties of resilient layer between the bottom of the recess and the prism holder may alter after a certain period of use. The properties are affected by temperature variations, water/moisture and other environmental factors. Furthermore, the flexibility can be inhibited over time, or an undesired movement in other directions may develop because of the ingress of foreign elements, or because of structural changes in the recess in the surface in which the device is installed.

The first and second disadvantages are both related to the fact that each prism grating in the known device withstands only a highly limited impact force from above. This is due to the fact that the prism grating is secured in place in the prism holder by means of an adhesive without any appreciable support against a lower supporting structure. Thus, one of the purposes of the elastic movability in the vertical direction is to prevent damage to or loosening of the prism gratings.

A third disadvantage of the known device is that there are difficulties in gaining access to the internal components, for example, when changing lamps or carrying out other maintenance operations.

A fourth disadvantage of the known device is that there are difficulties in removing or replacing the prism gratings as they are permanently bonded to the prism holder by means of adhesive.

A fifth disadvantage of the known device is that the light sources are not utilized in a sufficiently effective manner, as each light source is placed at a relatively great distance from the end of the associated prism grating facing the light source.

A sixth disadvantage of the known device is that the disclosed angle of 45° between the principal direction of the light source and a vertical axis does not give an optimum angle of reflection to ensure desired visibility from certain distances from the device and heights above the plane in which the device is to be installed.

A seventh disadvantage of the known device is that the prism holder and the prism gratings form a relatively large hollow space, where temperature gradients and temperature changes can cause condensation.

An eighth disadvantage of the known device is that the useful life of the light sources is shorter than desired, which is due in part to the fact that the heat generated by the light sources is not conducted away in a satisfactory manner, and causes a higher operating temperature than the optimum.

The lighting device described in Norwegian Patent Application 19996408, and from which the present application claims priority, solves most of the aforementioned problems in a satisfactory manner. In the application, the stresses on the prism are considerably reduced. The sandblast effect and the stresses from snow-clearing and sweeping equipment are reduced to a minimum, as the prisms and the surrounding structure lie in one and the same plane, namely the ground plane. Sand and sweeping equipment will therefore meet a plane surface that sand and brushes can sweep over without causing any significant damage. There will be no reason for snow, ice and dirt to accumulate around the prism.

However, it has been found that there are still some problems for which the last-mentioned patent application does not describe a satisfactory solution. Firstly, it has been found that with the lighting device, as defined in NO 19996408, it has not been fully possible to meet the stringent requirements that the International Civil Aviation Organization (ICAO) has set for airport lighting. To meet these requirements as regards lighting on taxiways involving lights having so-called narrow scattering, it is imperative, inter alia, that the average value of the light intensity within a horizontal angle range of +/−10° and a vertical angle range of from 10 to 80 from the ground should not be less than 200 cd (Candela (cd) is a light intensity measurement that takes into account the distance from the light source). It has not been possible to satisfy this requirement fully with the light source according to NO 19996408. This is because the light intensity is too weak close to the ground. However, the horizontal angle range is covered well, as is the vertical angle range of from 3° above the ground to some 10° above the ground.

In the light of these deficiencies, attempts have been made to reduce the angle $\beta$ with which the light beam strikes the exit face of the prism, i.e., the angle between the exit face and the longitudinal axis of the prism, from about 48° to about 46°. However, this reduced angle $\alpha\beta$ resulted in such a substantial weakening of the light intensity that the requirements were satisfied to an even lesser degree.

SUMMARY

According to the present application a solution has now been found where the requirements as regards average light intensity within the given angle ranges are satisfied. This is accomplished according to the invention by supplementing the angle $\beta$ with a certain angle of inclination on the exit face of the prism to such a degree that the combination of angle $\beta$ and the angle of inclination lowers the light cone sufficiently to meet the light intensity requirements close to the ground.

Furthermore, tests have shown that the edges of the prism around the exit face are highly susceptible to damage. This is particularly true of the front edge where the exit face meets the longest side face of the prism. This edge is very sharp, the said faces forming an angle of between 48° and 50° with one another. After some time there will be a large number of chips in this edge. Not only will this reduce the size of the exit face, and thus also the quantity of light emitted, it will also weaken the prism and in addition create a depression that dirt will penetrate into, and where at worst snow clearing equipment can become caught and shatter the whole prism.

According to another aspect of the present invention, the aforementioned problem is solved or least greatly diminished. This is accomplished by rounding the prism edges, as defined in the characterising clause of claim 8 below.

According to a preferred embodiment, the two narrow side faces of the prism are rounded. The object of the present invention is to provide a lighting device of the type mentioned in the introduction, and which remedies or overcomes at least some of the aforementioned disadvantages, and preferably all of them.

A lighting device in accordance with the invention can be made having a practically completely flat outer surface, so as to avoid projections or irregularities that are a nuisance to passing aircraft and other vehicles, and which especially form an obstacle during snow-clearing in the winter season.

A lighting device in accordance with the invention obviates the need for elastic flexibility in the vertical direction. This is due to the fact that the structure, equipped with a supporting means that supports the prism grating, provides considerably greater strength and load capacity. The device will be capable of withstanding repeated, direct stresses from, for example, passing aircraft wheels or snowploughs, without the prism gratings being damaged or loosened. The fact that the device does not have any movable parts means that it has greater long-term operational reliability and durability, under varying and at times extreme environmental conditions.

The structure according to a preferred embodiment, with a light source and associated reflector housed in a casing, fastened to a preferably integrated structure of flange, supporting and fastening means, makes for easier operations in connection with the changing of light sources or other maintenance work which requires access to the internal components of the device. By virtue of this structure, the light source has also been moved closer to the prism grating, which gives better utilization of the light from the light source. Furthermore, the space around the lamp unit and its associated parts is minimized, which reduces problems of condensation associated with temperature gradients and temperature changes.

An inclination corresponding to an angle $\beta$ between the main axis of the light source and the plane of reflection from the lighting device, where $\beta$ has a value of from about 48° to about 50°, preferably approximately 48°, optimizes the direction of emergence of the light with a view to ensuring that this direction is as close to horizontal as possible, and also optimizes the light intensity emitted.

The lamp units are preferably housed in a casing in direct, metallic, thermally conducting contact with the supporting means, which in turn is in metallic, thermally conducting contact with a cover. This allows good heat dissipation to a large, integral metal face, which in turn has a contact face against the external surroundings. The improved heat dissipation from the lamp units results in a lower operating temperature and a longer life for the light sources.

BRIEF DESCRIPTION OF THE DRAWING

The invention will now be described in more detail, with reference to the attached drawing wherein.

DETAILED DESCRIPTION

Figure 1:
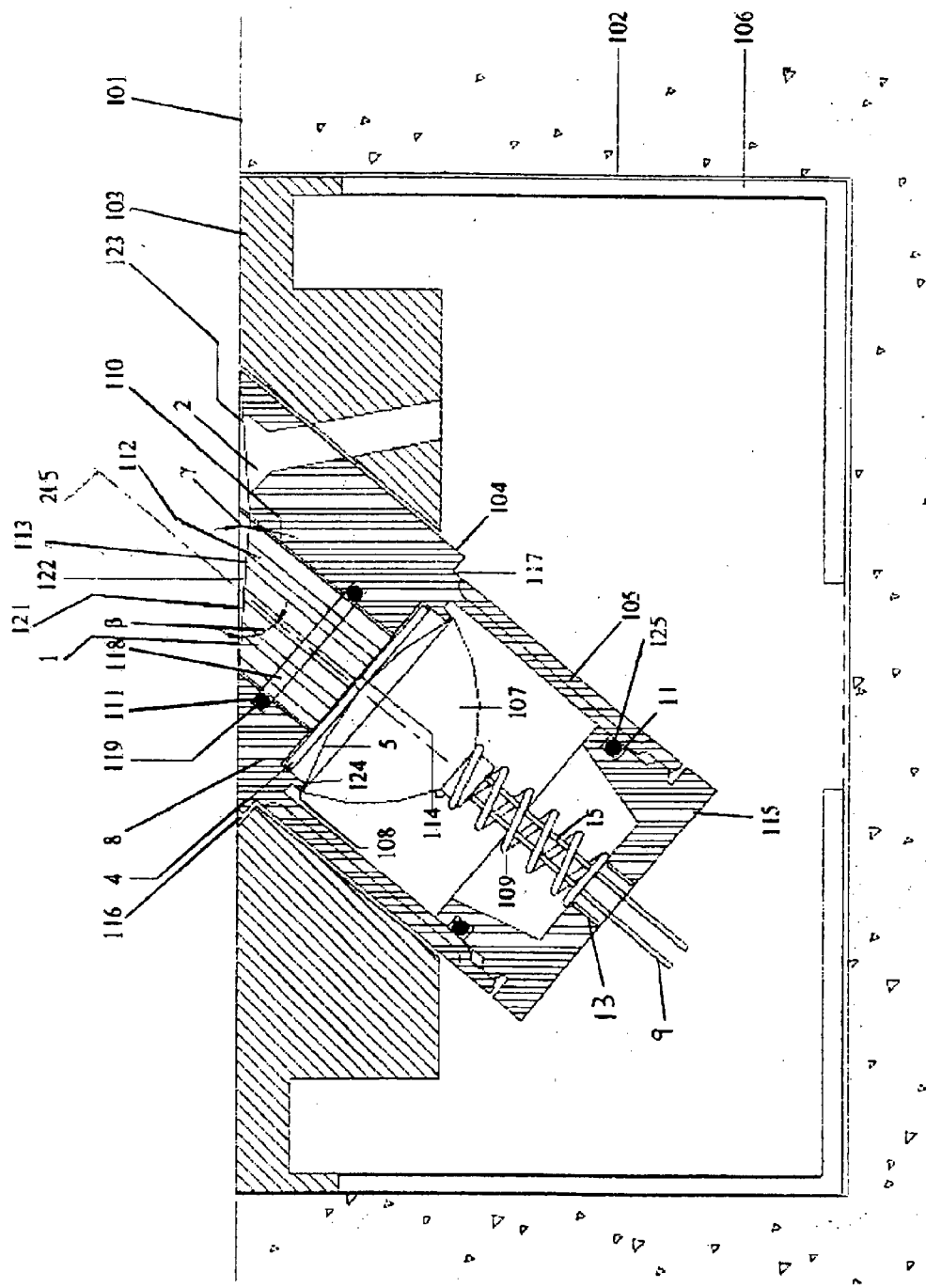
FIG. 1, is a lateral section of an exemplary lighting device.

The illustrated lighting device is intended to be installed in a substantially plane surface 101, for example, the surface of a runway at an airport. To keep the illustration simple, the lighting device shown in the figure comprises just one lamp unit 8 and one light refracting means in the form of a prism grating 1. However, most lighting means will comprise two lamp units 8 which emit light in opposite directions.

A recess 102 is made in the surface 101. A base structure 106 in the form of a cylindrical well is placed in the recess 102. At its upper edge, the well is covered by a cover 103. The cover may be fastened to the well with the aid of a plurality of sunken screws (not shown), preferably two, through the cover and into threaded holes (not shown) in the well. A seal (not shown) may be provided between the well and the cover. The well is positioned at such a depth that the top face of the cover 103 lies in the same plane as the surface 101. The bottom of the well has at least one opening towards the ground below, for, inter alia, drainage purposes.

The cover 103 has an opening for sunken installation of a lamp device 8. The lamp device is secured to the cover by means of at least one fixing screw 2 through a hole in the lamp device 8. Alternatively, the lamp device 8 can be secured in another way, at the option of the skilled person in the field, but in such manner that the top face 111 of the lamp device lies in the same plane as the top face of the cover 103 and the surface 101.

The lamp device 8 comprises a prism holder 104, a light source housing 105, and a back cover 115. In the illustrated, preferred embodiment, the prism holder 104 and the light source housing 105 are made as integral parts, the two being made, preferably cast, in one piece. Alternatively, the prism holder and the light source housing can be separate parts that are held together by means of screws or similar temporary fasteners, or they can be originally separate parts that are permanently joined by welding, soldering or similar known, permanent joining means.

The cover 103, the well 106, the lamp device 8 and the back cover 115 consist of a material having high thermal conductivity, good mechanical strength, strong resistance against outdoor environmental impacts, including temperature fluctuations, water and chemical compositions that may be found at airports and on roads. The material must also have a suitable workability for manufacture. Preferably, a metal material is used, most preferably an aluminium alloy, or alternatively cast iron or other iron alloys. The back cover and the lamp device preferably have a circular cross-section. A circular cross-section permits these parts to be made by turning. This gives a wider material choice than when casting.

An encircling shoulder 116 is provided in the opening in the lamp device 8 cover 103. The prism holder 104 has a complementary encircling shoulder 117, so that the lamp device has a defined insertion depth in the cover 103.

Arranged inside the light source housing 105 is a light source 107 that is held against a flange 108 by a spring 109 which acts between the cover 103 and the light source 107. A power supply cable 9 runs from the light source 107 through the back cover 115 to a non-illustrated power supply.

The prism holder 104 encloses and supports a light refracting means 1, which preferably consist of a prism grating.

The prism grating 1 is of a type similar to that described in U.S. Pat. No. 4,860,182, inasmuch as it consists of a glass material in the form of parallel disks 112 having a common longitudinal direction. The discs preferably consist of borosilicate glass. This glass is a clear, inexpensive glass which is also frequently used, for example, as picture glass. It is also possible to use glass having a greater refractive index, but to do so it would be necessary to use special glass that is otherwise used in connection with optics (glasses, binoculars, microscopes and telescopes), and which is very expensive. The present invention allows the use of an inexpensive, commercial unhardened glass that is easy to handle and cut, and that does not require any subsequent hardening.

Placed between each pair of adjacent discs 112 is a thin layer of metal foil 113, preferably a copper alloy, or another metal having good thermal conduction. If thermal conduction is not important, it is possible, instead of a metal foil, to use a coloured layer that is applied to at least one side of the glass discs 112. It is preferable that copper should be used as the metal foil. This is because copper has been found to withstand the heat that is generated during cutting and/or polishing of the prism without melting into the cutting surface. Copper also has high thermal conductivity and is favourably priced. The copper foil also acts as reinforcement of the prism and endows it with great strength. Aluminium could also have been used, but it has been found that it does not withstand the temperature generated during cutting/polishing operations.

Each of the glass discs 112 preferably has an average length (measured from the incident face 114 to the exit face 121) of between 15 and 30 mm, most preferably about 25 mm. They have a thickness of preferably between 1 mm and 2 mm, and most preferably about 1.6 mm. The thickness and the average length are closely related, as the average length must be reduced when the thickness of the discs is reduced, in order to obtain approximately the same light transmitting capacity. A smaller thickness than that mentioned above would increase the number of layers in the prism and thus make production considerably more expensive, and also cause the shortest discs to be so short that the prism would be very thin in that area, and so reduce the strength considerably. A greater thickness would increase the scattering of light to beyond the acceptable level and make the prism inconveniently long.

The thickness of the copper foil 113 is preferably from about 0.1 to about 0.2 mm, most preferably about 0.1 mm. A thinner foil would be extremely difficult to handle during production and would reduce the thermal conductivity and heat distribution capacity, whilst a thicker foil would reduce the area of light transmission, add to the cost the prism and actually also diminish the strength, as the copper, which has a lower strength than glass, would be the weakest link.

Thermal conduction is not the only advantage the copper foil 113 offers. It is also essential to obtain good heat distribution. This is particularly important when a prism that has been heated to a high temperature by the light source is suddenly exposed to the effects of severe cold from snow or ice thrown from a snowplough. If the heat distribution capacity is poor, the prism could easily crack.

The heat that is conducted away helps to melt any snow and ice that settles on the prism.

A prism grating of this kind has a good capacity for directional light transmission in the longitudinal direction of the prism grating, parallel to the discs 112.

The outsides of the longitudinal sides of the prism grating 1, called the side faces, may preferably be covered by a metal foil of the same type. It is particularly advantageous to cover the two side faces that are parallel to the glass discs with a metal foil of this kind.

The last-mentioned feature involves both an improvement in the directional light transmission of the prism grating and also an advantage during the mechanical finishing of the prism grating 1.

The discs 112 and the pieces of foil 113 are adhesively bonded to one another.

The prism grating 1 has an incident face 114 that is preferably plane and at right angles to the longitudinal direction of the prism grating 1, represented by the longitudinal axis 215, so that incident light in the longitudinal direction of the prism grating does not change direction as a result of refraction at the incident face 114. A design of this kind is particularly suitable if it is desired that a concentrated, parallel light should be emitted from the lighting device.

Alternatively, the incident face may be curved or concave, so that incident light in the longitudinal direction of the prism grating results in the light beams being refracted at the incident face and scattered, essentially in a plane parallel to the discs in the prism grating. A design of this kind is particularly suitable if it is desired that scattered light should be emitted from the lighting device.

The prism 1 has a width (perpendicular to the plane of the drawing) corresponding approximately to the width of the light source 107, i.e., about 50 mm, whilst the width at right angles to this may well be smaller. In cross-section, at right angles to the longitudinal direction, the prism preferably has the form of a rectangle with rounded, preferably circular sector shaped short sides. The edges around the exit face 121, especially the sharp edge formed between the exit face 121 of the prism 1 and the side face 110 are slightly rounded, to prevent the edges from being chipped.

A groove 118 for an O-ring 119 is provided in the prism holder 104. The O-ring 119 consists of a robust material having elastic properties, preferably a rubber material. The O-ring 119 has two primary functions. First, it is to seal against water penetration past the prism 1 and, secondly, it is to hold the prism in position. In addition to the O-ring 119, an adhesive substance may be applied to the side faces of the prism 1 and/or the surrounding walls of the prism holder 104, which further helps to secure the prism and seal against water penetration. The adhesive substance should be of a type that allows the prism to be pressed out of the prism holder, for example, for replacement. The prism 1 according to the invention can be removed and inserted with the aid of a hydraulic press apparatus.

In the illustrated embodiment, the side faces of the prism are tightly enveloped by the prism holder 104. An essential aspect of the invention is that the prism holder 104, by means of a supporting face 110 supports the prism at it longest side face. This is accomplished by allowing the prism holder to extend along the whole of or a substantial part of the length of the prism. Here, the length of the prism should be understood to mean the longest of the side faces of the prism.

The prism holder 104 also advantageously comprises a shoulder (not shown) that supports the prism at its lower face 114, and which prevents the prism from being pushed into the lamp device 8 as a result of an external force from the surface.

The configuration of the inclination of the prism holder 104 is a determining factor for the longitudinal direction of the prism 1. This inclination should be understood as the angle β between the supporting face 110, identical to the longitudinal direction of the prism and the direction of emitted light from the light source, and the exit face 121 of the prism.

The angle β is preferably from about 48° to about 50°, and most preferably about 48°. This angle has been found to cause the light emitted to have sufficient intensity, at the same time as the best results with respect to the height of the light cone above the ground are obtained. However, this still does not allow the light cone to be lowered sufficiently far towards the ground. Therefore, according to the invention, the exit face 121 of the prism 1 is slightly inclined relative to the surface 101, more specifically at an angle γ of from about 2° to about 4° degrees, preferably approximately 3°. This is done by shaping the top face of the prism holder 104 so that a first portion 122 extends downwards at an angle γ towards the sharp end of the prism, and a second portion 123 extends upwards from the sharp end of the prism 1 to the plane of the cover 103. Thus, a tiny depression is made at the prism 1. The angle γ is large enough to lower the light cone sufficiently to satisfy the ICAO's requirements without the depression made causing any of the disadvantages associated with lighting devices that are not flush with the ground. The depression will barely be visible and the lighting device will therefore be considered as "full flush".

It is important to stress that the invention is not only based on satisfying the ICAO's requirements, but also on ensuring that optimum lighting is obtained along the ground, as regards both light intensity and angle of light.

Against the incident face of the prism grating, i.e., the face that is closest to the light source and reflector, there is advantageously provided an optional colour filter 4, held in place by a retaining means 5 in the form of a filter spring. The filter spring is fixed in a groove 124 in the flange 108. The retaining means 5 is preferably a wire spring, alternatively a leaf spring, made of an elastic material such as, for example, spring steel.

The colour filter 4 will affect the wave length range of the light emitted from the lighting device. The filter can easily be changed by first unscrewing the back cover 115, then removing the light source 107 and lastly removing the filter spring 5.

The light source housing 105 comprises internal threads at the end facing away from the prism holder 104. These threads are arranged for the mounting of the back cover 115 which has external, matching threads. The back cover 115 is designed to hold the light source 107 firmly in position. An O-ring 11 placed in a groove 125 in the back cover 115 provides sealing between the back cover 115 and the light source housing 105.

The light source housing 105 is preferably an integral part of the prism holder 104, and consists preferably of the same material as the prism holder. In an especially preferred embodiment, the prism holder 104 and the light source housing are turned out of one blank. On the outside of the light source housing 105 cooling ribs (not shown) may be formed. These may, for example, be made by turning a spiral groove that runs around the circumference of the light source housing and along the length thereof. Alternatively, the prism holder 104 and the light source housing 105 can be separate parts that are held together by means of screws or similar temporary fasteners, or they may be originally separate parts that are permanently joined by welding, soldering or similar known joining means.

It is preferable that the light source 107 should be made as a light source having an associated reflector and possibly cover glass. Suitable light sources for the purpose are commercial reflector-halogen lamps, for example, of the mark Osram, with an output of 20 to 80 W, typically 35 W or 45 W, and with an operating voltage of typically between 6 and 24 V, for example, 12 V. Optionally a lamp of the noble gas type, for example, a krypton lamp, may be used.

It is advantageous to provide a spacer ring (not shown) in front of the reflector or cover glass. During assembly, the spacer ring will come into fixed, sealing contact with the light source 107 on the one side and the flange 108 on the other side.

The light source 107 is connected electrically by means of a cable 15, which is passed through an ordinary cable lead-in which, with the aid of an O-ring 13, provides sealing between the cable insulation and the casing. The cable lead-in is preferably provided with external threads, adapted to internal threads at the extreme end of the back cover 115.

In the above description it has been stated that a lighting device in accordance with the invention can be used as marking lights on runways. However, it should be appreciated that the lighting device is suitable for installation in any substantially plane surface where there is a need for lighting directed from the surface at a given angle. Examples of alternative areas of use are thus the marking of lines/bends in roads for vehicular or pedestrian traffic, in tunnels, for lighting other objects such as, e.g., sculptures or similar pieces of art, for example, in town squares and parks.

The uses are not limited to situations where the substantially flat face is horizontal and where the light is directed in part upwards. Thus, the invention can be used for installation is walls, ceilings, roofs and in sloping faces. The invention nevertheless has special advantages in uses where there is a need to be able to physically load the part of the device that substantially lies level with the surface.

What is claimed is:

1. A lighting device for installation in a substantially plane surface, comprising:
    at least one lamp device that emits light in a light direction which forms an exit angle with an exit face of a single light refracting means, in the lamp device said lamp device comprising a light source that emits light towards an incident face of the light refracting means, and a color filter, wherein the lamp device is in the form of a unit with said light source and said refracting means, wherein the light refracting means has a longitudinal direction coincident with said light direction, and where the exit face is substantially parallel to the substantially plane surface, and that the light refracting means is made of a prism grating, consisting of discs of a glass material and light preventing cover layers placed between the discs, the exit face is set at a slight angle of inclination, relative to the substantially plane surface, the exit angle and the angle of inclination in combination causing light from the light source to be brought to an emergent angle above the surface that satisfies pre-set requirements for light intensity close to the surface.

2. The lighting device according to claim 1, wherein the angle of inclination is from about 2° to about 4°.

3. The lighting device according to claim 1, wherein the angle of inclination is about 3°.

4. A lighting device for installation in a substantially plane surface, comprising:
    at least one lamp device that emits light essentially in a light direction which forms an exit angle with an exit face of a single light refracting means, in the lamp device said lamp device comprising a light source that emits light towards an incident face of the light refracting means, and a color filter, wherein the lamp device is in the form of a unit with said light source and said refracting means, wherein the light refracting means has a longitudinal direction coincident with said light direction, and wherein the exit face is approximately parallel to the substantially plane surface and that the light refracting means is made of a prism grating, consisting of discs of a glass material and light preventing cover layers placed between the discs, the exit face is set at a slight angle of inclination from about 2° to about 4° relative to the substantially plane surface, the exit angle and the angle of inclination in combination causing light from the light source to be brought to an emergent angle above the surface that satisfies pre-set requirements for light intensity close to the surface.

5. The lighting device for installation in a substantially plane surface, comprising:
    at least one lamp device that emits light essentially in a light direction which forms an exit angle with an exit face of a single light refracting means, in the lamp device said lamp device comprising a light source that emits light towards an incident face of the light refracting means, and a color filter, wherein the lamp device is in the form of a unit with said light source and said refracting means, wherein the light refracting means has a longitudinal direction coincident with said light direction, and wherein the exit face is approximately parallel to the substantially plane surface and that the light refracting means is made of a prism grating, consisting of discs of a glass material and light preventing cover layers placed between the discs, the exit face is set at a slight angle of inclination of about 3° relative to the substantially plane surface, the exit angle and the angle of inclination in combination causing light from the light source to be brought to an emergent angle above the surface that satisfies pre-set requirements for light intensity close to the surface.

6. The lighting device according to claim 1, wherein the exit angle is from about 48° to about 50°.

7. The lighting device according to claim 2, wherein the exit angle is from about 48° to about 50°.

8. The lighting device according to claim 3, wherein the exit angle is from about 48° to about 50°.

9. The lighting device according to claim 4, wherein the exit angle is from about 48° to about 50°.

10. The lighting device according to claim 5, wherein the exit angle is from about 48° to about 50°.

11. The lighting device according to claim 1, wherein the exit angle is about 48°.

12. The lighting device according to claim 2, wherein the exit angle is about 48°.

13. The lighting device according to claim 3, wherein the exit angle is about 48°.

14. The lighting device according to claim 4, wherein the exit angle is about 48°.

15. The lighting device according to claim 5, wherein the exit angle is about 48°.

16. The lighting device according to claim 1, wherein the angle of inclination is provided by making an inclined plane in the substantially plane surface, which inclined plane covers a portion around the exit face of the light refracting means, and the light refracting means is arranged with the exit face parallel to the inclined plane.

17. The lighting device according to claim 2, wherein the angle of inclination is provided by making an inclined plane in the substantially plane surface, which inclined plane covers a portion around the exit face of the light refracting means, and the light refracting means is arranged with the exit face parallel to the inclined plane.

18. The lighting device according to claim 3, wherein the angle of inclination is provided by making an inclined plane in the substantially plane surface, which inclined plane covers a portion around the exit face of the light refracting means, and the light refracting means is arranged with the exit face parallel to the inclined plane.

19. The lighting device according to claim 4, wherein the angle of inclination is provided by making an inclined plane in the substantially plane surface, which inclined plane covers a portion around the exit face of the light refracting means, and the light refracting means is arranged with the exit face parallel to the inclined plane.

20. The lighting device according to claim 5, wherein the angle of inclination is provided by making an inclined plane in the substantially plane surface, which inclined plane covers a portion around the exit face of the light refracting means, and the light refracting means is arranged with the exit face parallel to the inclined plane.

21. The lighting device according to claim 6, wherein the angle of inclination is provided by making an inclined plane in the substantially plane surface, which inclined plane covers a portion around the exit face of the light refracting means, and the light refracting means is arranged with the exit face parallel to the inclined plane.

22. The lighting device according to claim 11, wherein the angle of inclination is provided by making an inclined plane in the substantially plane surface, which inclined plane covers a portion around the exit face of the light refracting means, and the light refracting means is arranged with the exit face parallel to the inclined plane.

23. The lighting device according to claim 1, in which the angle of inclination is provided by making an inclined plane in the substantially plane surface, which inclined plane covers a portion around the exit face of the light refracting means, and the light refracting means is arranged with the exit face flush with the inclined plane.

24. The lighting device according to claim 2, wherein the angle of inclination is provided by making an inclined plane in the substantially plane surface, which inclined plane covers a portion around the exit face of the light refracting means, and the light refracting means is arranged with the exit face flush with the inclined plane.

25. The lighting device according to claim 3, wherein the angle of inclination is provided by making an inclined plane in the substantially plane surface, which inclined plane covers a portion around the exit face of the light refracting means, and the light refracting means is arranged with the exit face flush with the inclined plane.

26. The lighting device according to claim 4, wherein the angle of inclination is provided by making an inclined plane in the substantially plane surface, which inclined plane covers a portion around the exit face of the light refracting means, and the light refracting means is arranged with the exit face flush with the inclined plane.

27. The lighting device according to claim 5, wherein the angle of inclination is provided by making an inclined plane in the substantially plane surface, which inclined plane covers a portion around the exit face of the light refracting means, and the light refracting means is arranged with the exit face flush with the inclined plane.

28. The lighting device according to claim 6, wherein the angle of inclination is provided by making an inclined plane in the substantially plane surface, which inclined plane covers a portion around the exit face of the light refracting means, and the light refracting means is arranged with the exit face flush with the inclined plane.

29. The lighting device according to claim 11, wherein the angle of inclination is provided by making an inclined plane in the substantially plane surface, which inclined plane covers a portion around the exit face of the light refracting means, and the light refracting means is arranged with the exit face flush with the inclined plane.

30. The lighting device according to claim 1, further comprising:
a cover having a top face substantially flush with the plane surface wherein the lamp device is arranged in an opening in the cover, and the lamp device comprises a top face that is arranged to be brought into a substantially flush position relative to the top face of the cover.

31. The lighting device according to claim 2 further comprising:
a cover having a top face substantially flush with the plane surface wherein the lamp device is arranged in an opening in the cover, and the lamp device comprises a top face that is arranged to be brought into a substantially flush position relative to the top face of the cover.

32. The lighting device according to claim 3 further comprising:
a cover having a top face substantially flush with the plane surface, wherein the lamp device is arranged in an opening in the cover, and the lamp device comprises a top face that is arranged to be brought into a substantially flush position relative to the top face of the cover.

33. The lighting device according to claim 4 further comprising:
a cover having a top face substantially flush with the plane surface wherein the lamp device is arranged in an opening in the cover, and the lamp device comprises a top face that is arranged to be brought into a substantially flush position relative to the top face of the cover.

34. The lighting device according to claim 5 further comprising:
a cover having a top face substantially flush with the plane surface wherein the lamp device is arranged in an opening in the cover, and the lamp device comprises a top face that is arranged to be brought into a substantially flush position relative to the top face of the cover.

35. The lighting device according to claim 6 further comprising:
a cover having a top face substantially flush with the plane surface wherein the lamp device is arranged in an opening in the cover, and the lamp device comprises a top face that is arranged to be brought into a substantially flush position relative to the top face of the cover.

36. The lighting device according to claim 11 further comprising:
a cover having a top face substantially flush with the plane surface wherein the lamp device is arranged in an opening in the cover, and the lamp device comprises a top face that is arranged to be brought into a substantially flush position relative to the top face of the cover.

37. The lighting device according to claim 23 further comprising:
a cover having a top face substantially flush with the plane surface wherein the lamp device is arranged in an opening in the cover, and the lamp device comprises a top face that is arranged to be brought into a substantially flush position relative to the top face of the cover.

38. The lighting device according to claim 16, wherein the inclined plane is made in the top face of the lamp device.

39. The lighting device according to claim 23, wherein the inclined plane is made in the top face of the lamp device.

40. A lighting device according to claim 30, wherein the inclined plane is made in the top face of the lamp device.

41. The lighting device according to claim 16, wherein the lamp device has a circular cross-section.

42. The lighting device according to claim 23, wherein the lamp device has a circular cross-section.

43. The lighting device according to claim 30, wherein the lamp device has a circular cross-section.

44. A lighting device for installation in a substantially plane surface, comprising:
   at least one lamp device that emits light essentially in a light direction which forms an angle with an exit face of a light refracting means the lamp device, said lamp device comprising a light source that emits light towards an incident face of the light refracting means, wherein the light refracting means has a longitudinal direction coincident with the said light direction, and wherein the exit face is approximately parallel to the substantially plane surface, wherein the light refracting means is a prism grating consisting of discs of a glass material and light transmission preventing cover layers placed between the discs, wherein the prism grating comprises side faces running from the exit face to the incident face, at least one of the side faces forming an acute angle with the exit face, and at least the edge of the prism grating formed by at least the one side face that forms an acute angle between said side face and the exit face is rounded.

45. The lighting device according to claim 44, wherein the edges of the prism between the side faces are rounded, wherein two opposite side faces are curved.

46. The lighting device according to claim 44, wherein the discs have an average length between the incident face and the exit face from about 15 mm to about 30 mm, and a thickness between the cover layers from about 1 mm to about 2 mm.

47. The lighting device according to claim 45, wherein the discs have an average length between the incident face and the exit face from about 15 mm to about 30 mm, and a thickness between the cover layers from about 1 mm to about 2 mm.

48. The lighting device according to claim 44, wherein the discs have an average length between the incident face and the exit face of about 25 mm and a thickness between the cover layers of about 1.6 mm.

49. The lighting device according to claim 45, wherein the discs have an average length between the incident face and the exit face of about 25 mm and a thickness between the cover layers of about 1.6 mm.

50. The lighting device according to claim 23, wherein the cover layers are metal foil, and have a thickness from about 0.1 mm to about 0.2 mm.

51. The lighting device according to claim 30, wherein the cover layers are metal foil, and have a thickness from about 0.1 mm to about 0.2 mm.

52. The lighting device according to claim 39, wherein the cover layers are metal foil, and have a thickness from about 0.1 mm to about 0.2 mm.

53. The lighting device according to claim 23, wherein the cover layers are copper foil.

54. The lighting device according to claim 30, wherein the cover layers are copper foil.

55. The lighting device according to claim 39, wherein the cover layers are copper foil.

56. The lighting device according to claim 23, wherein the cover layers have a thickness of about 0.1 mm.

57. The lighting device according to claim 30, wherein the cover layers have a thickness of about 0.1 mm.

58. The lighting device according to claim 39, wherein the cover layers have a thickness of about 0.1 mm.

* * * * *